Aug. 18, 1970 F. A. RISKY 3,524,933

LINE CIRCUIT SCANNER FOR ELECTRONIC TELEPHONE SYSTEMS

Filed Sept. 14, 1967 10 Sheets-Sheet 1

INVENTOR.
FRANK A. RISKY

BY Leonard J. Kalinowski

AGENT

LINE CIRCUIT SCANNER FOR ELECTRONIC TELEPHONE SYSTEMS

Filed Sept. 14, 1967 10 Sheets-Sheet 5

LINE CIRCUIT SCANNER FOR ELECTRONIC TELEPHONE SYSTEMS

Filed Sept. 14, 1967 10 Sheets-Sheet 7

LINE CIRCUIT SCANNER FOR ELECTRONIC TELEPHONE SYSTEMS

Filed Sept. 14, 1967 10 Sheets-Sheet 9

LINE CIRCUIT SCANNER FOR ELECTRONIC TELEPHONE SYSTEMS

United States Patent Office 3,524,933
Patented Aug. 18, 1970

3,524,933

LINE CIRCUIT SCANNER FOR ELECTRONIC TELEPHONE SYSTEMS

Frank A. Risky, Cicero, Ill., assignor to Automatic Electric Laboratories, Inc., Northlake, Ill., a corporation of Delaware Filed Sept. 14, 1967, Ser. No. 667,791
Int. Cl. H04q 3/42
U.S. Cl. 179—18 9 Claims

ABSTRACT OF THE DISCLOSURE

A subsystem for monitoring a plurality of line circuits in a telephone switching comprises a plurality of magnetic sensing elements arranged in a matrix array and each individually connected to one of the circuits being monitored; matrix access circuits including an address register, a plurality of current generators and a plurality of row switches, combinations of which permit the application of interrogate pulses to each row of elements in the matrix; and a timing pulse generator. In response to the receipt of a distinct read command or start signal from the common control the timing pulse generator latches up and generates a number of separate timing pulses which are chronologically related to each other and to the start signal. Once the start signal has been received these pulses precisely sequence the operation of the subsystem and, in particular, control the accessing and the readout of the matrix during an interrogate cycle, the results of the interrogation being returned to the common control. The subsystem further includes circuits which, under the control of the aforementioned timing pulses, monitor the cable by which the common control read command is received and determine the duration of the read command and the interval between successive read commands to provide noise immunity for the subsystem. In addition, subsystem circuits monitor, again under the control of the above timing pulses, the address register, the current generators and the row switches to provide an indication to the common control that they are functioning properly.

BACKGROUND OF THE INVENTION

This invention relates to electronic communication systems of the common control type and more particularly, to a subsystem for monitoring circuits in an electronic communication system.

One of the requirements of state-of-the-art communication systems, whether electromechanically or electronically controlled, is the monitoring of circuits which exhibit changing conditions from time to time. In telephone exchanges, lines, trunks and junctor circuits can exhibit such changes as a result of direct action taken by a subscriber or as a result of control or switching operations of the telephone switching system. In electronic communication systems it is desirable to employ an electronic scanning subsystem as an interface between the circuits to be monitored, when exhibit changes at a relative slow rate, and the electronic control circuits of the system, which operate at much faster rates. The electronic scanner monitors the circuits to detect any changes in conditions that might occur and converts these changes into an input form suitable for acceptance by the electronic control circuits of the communication system. Hence, the electronic scanner is commonly referred to as an "input detector."

One such electronic scanner or input detector subsystem for monitoring the condition of telephone lines, trunks, junctor circuits or other circuits of an electronic communication system is described in U.S. Pat. 3,254,157 of A. M. Guercio and H. F. May. The scanner employs a plurality of magnetically controlled devices, each associated with a circuit to be monitored, and arranged in a matrix array The devices, called ferrods, are each comprised of an elongated stick of square-loop ferrite material having a control winding connected to the circuit being monitored, and interrogate and sense windings connected to the matrix access circuitry. The interrogation of the devices of the matrix is under the control of a common control which generates all control orders and address information required to permit the interrogation of predetermined ones of the matrix elements and sends these orders to the scanner.

The ferrod devices are interrogated a row at a time by a core matrix which applies, in response to the receipt of an address from the common control, a bipolar pulse to the interrogate loop which is wound on each ferrod in the addressed matrix row. Each ferrod monitoring an idle line is longitudinally unsaturated so that the bipolar pulse is coupled into the sense winding as the result of flux switching in the ferrite device. Ferrods monitoring busy lines, on the other hand, will be longitudinally saturated due to the presence of current in the control windings and consequently, the pulse will not be coupled from the interrogate to the sense winding. The sense windings are connected together in columns to output circuits for returning to the common control status information as to the monitored lines over an answer bus.

More details regarding the ferrod element itself and its application as a monitoring device can be had by referring to the above-identified patent. As mentioned above, in the arrangement disclosed in U.S. Pat. 3,254,157 the common control generates all the information required for the interrogation of the ferrod matrix. More particularly, the address information signals are combined with an enable pulse selected by a central pulse distributor and the result of the combination is passed through a pulse stretcher for accessing the above-mentioned core matrix by means of which the ferrod matrix is interrogated. The other enabling pulses controlling the scanner, including in particular the gating pulse used for strobing the output of the ferrod matrix onto the reply bus leading back to the common control, are likewise directly derived from the output of the above-mentioned pulse stretcher, viz. through the medium of delay and pulse shaper circuits and the like.

SUMMARY OF THE INVENTION

Briefly, this invention provides a subsystem for monitoring a plurality of circuits in a communication system. The subsystem includes a matrix array of magnetically saturable scanning devices each associated with a circuit to be monitored. The devices are interrogated through access circuitry which includes current generators and row switches which are operated and controlled by the subsystem itself. An interrogate cycle is initiated by a common control which transmits a distinct start signal to a timing apparatus provided as a part of the subsystem, which signal causes this timing apparatus, including in particular a timing pulse generator forming part of this apparatus, to latch up and initiate an interrogation cycle for interrogating a particular row of devices. The common control provides the address of the particular row of devices to be interrogated. Upon receipt of the start signal, the subsystem generates its own timing and control signals and completes the access and readout of the matrix independently of the common control. The subsystem provides an indication to the common control that it has received a start signal and that an interrogation cycle is in progress. Under the control of the aforementioned timing signals, the subsystem subsequently provides an indication to the common control that the interrogate cycle has been successfully completed and that data is available to be read by the common control. The subsystem has self-checking circuits which make maintenance checks during each interrogate cycle and the activation of these circuits, too, may readily be controlled by the above mentioned timing pulses. The results of these maintenance checks are returned to the common control in conjunction with the generation of the indication that the interrogate cycle has been successfully completed.

As compared with the technique disclosed in U.S. Pat. 3,254,157 the provision, according to the invention, of the aforementioned timing apparatus in the subsystem, which latches up once it has been triggered by the above start signal, makes it possible to generate in this subsystem by means of the above timing pulse generator any number of timing signals chronologically related to each other as well as to the start signal received from the common control—economically and yet with utmost flexibility and precision and without reliance on the quality of the signal or signals received from the common control. In fact, some of the timing signals generated by the timing apparatus of the invention may in turn be utilized, as described hereinafter, to monitor the characteristics of the start signal and, for example, cause it to be ignored if these characteristics fail to meet the necessary standards.

To transmit such a plurality of precise timing signals individually from the common control to the subsystem would present considerable difficulties. The reason for this is that the buses which interconnect the common control with the subsystem and whose length—which may be considerable in many cases—as well as termination characteristics may vary from installation to installation, would, in all probability, give rise to propagation times of different magnitude for the various signals involved. Moreover, the holding time of the common control, as well as the noise susceptibility of the overall system would be, correspondingly increased.

Figure 13:
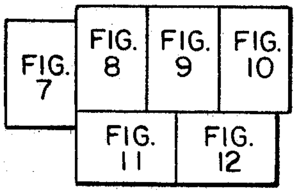
Figure 6:
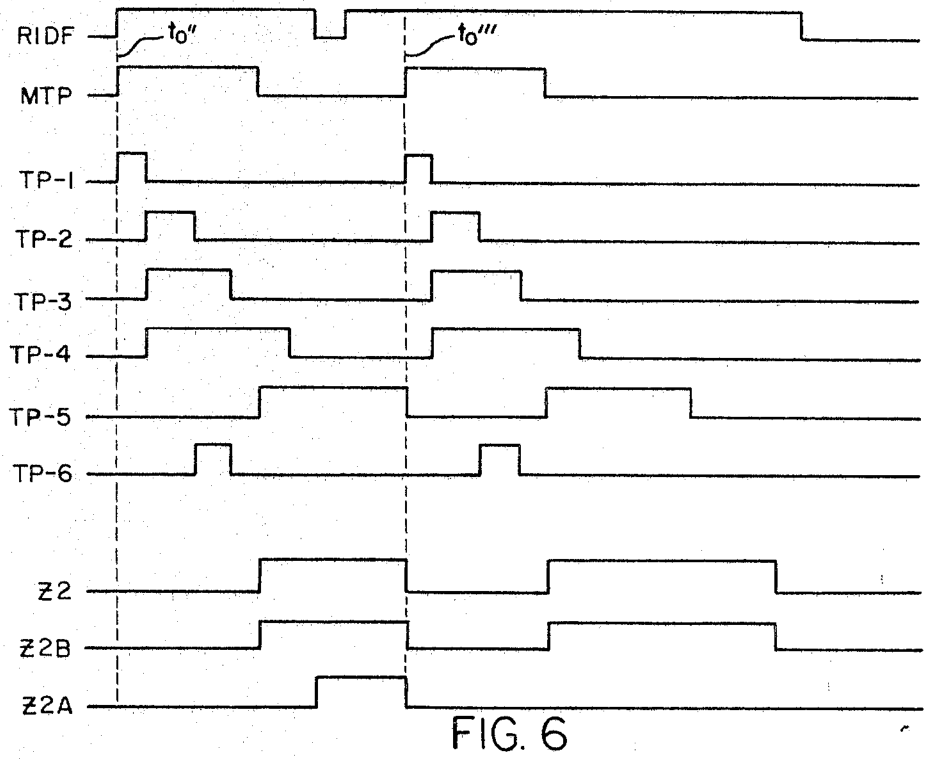
Figure 7:
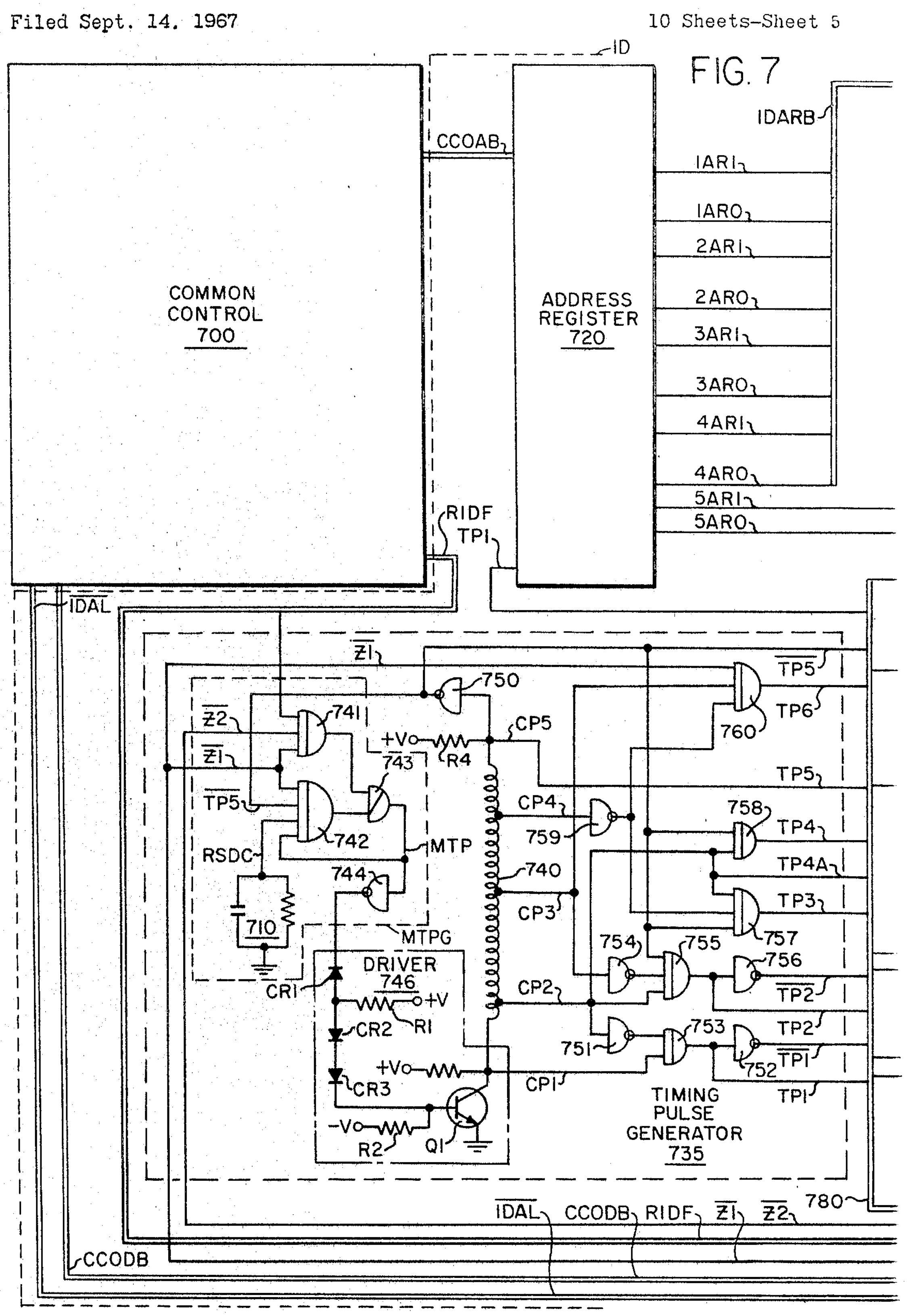
Figure 8:
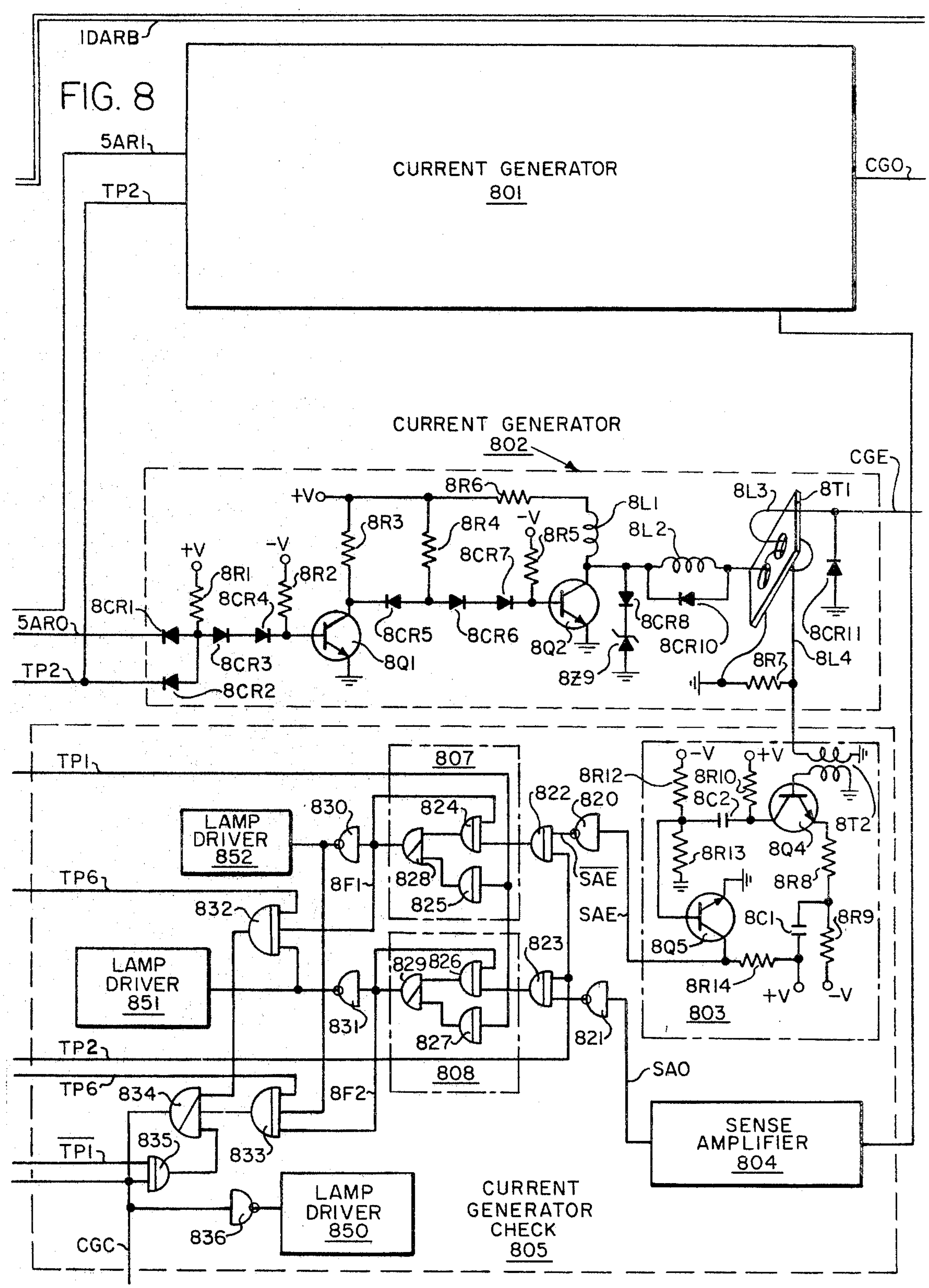
Figure 9:
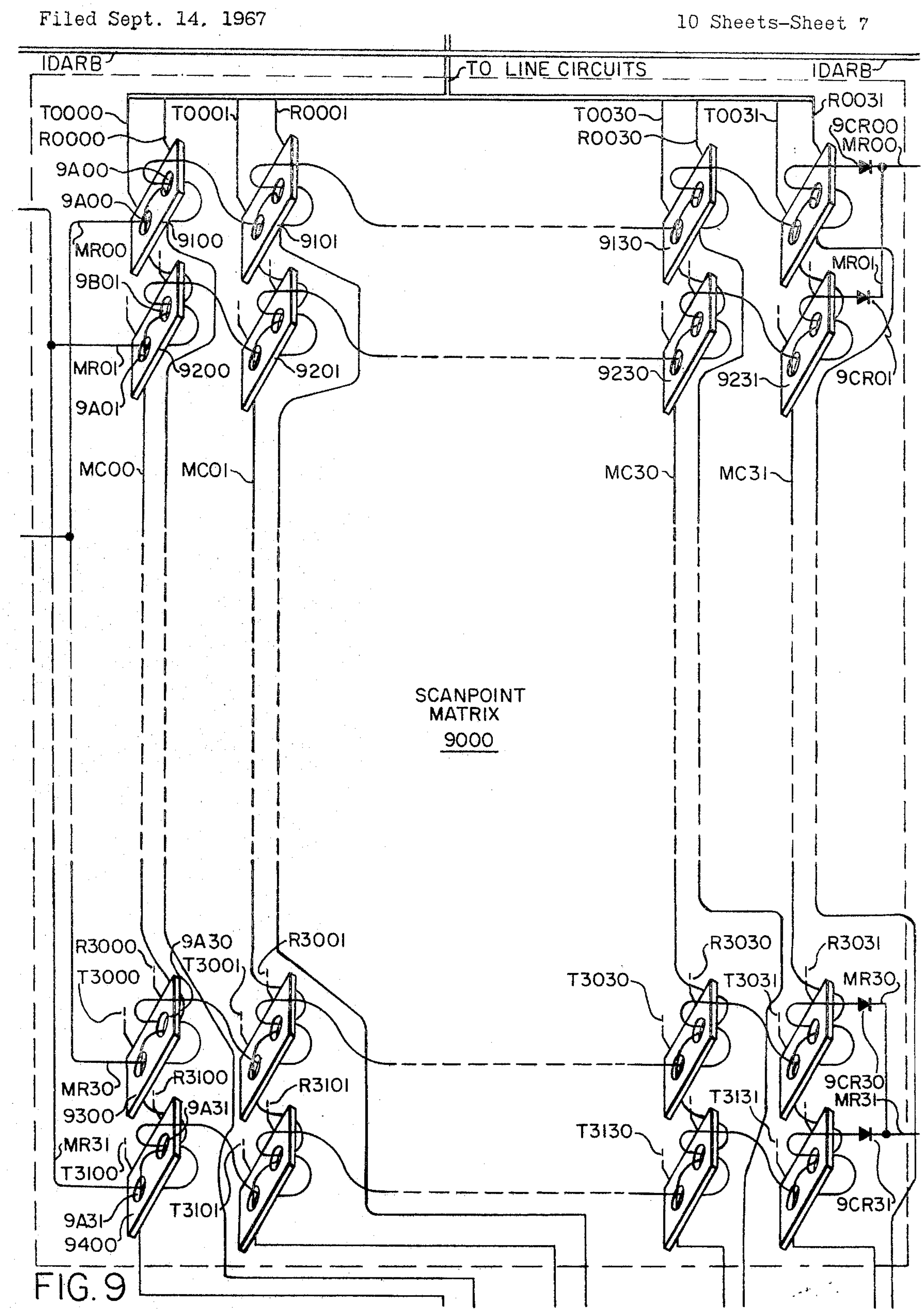
Figure 10:
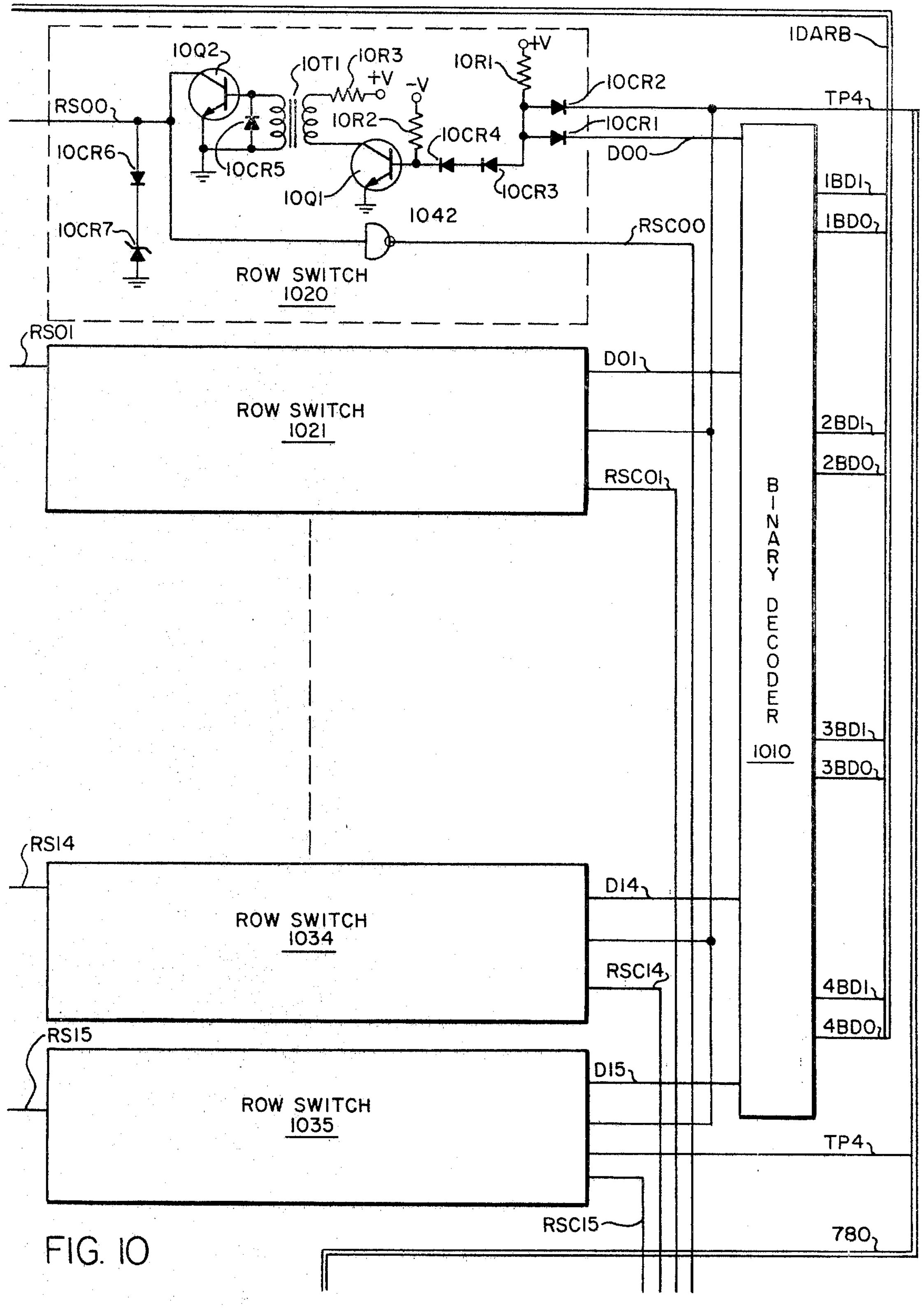
Figure 11:
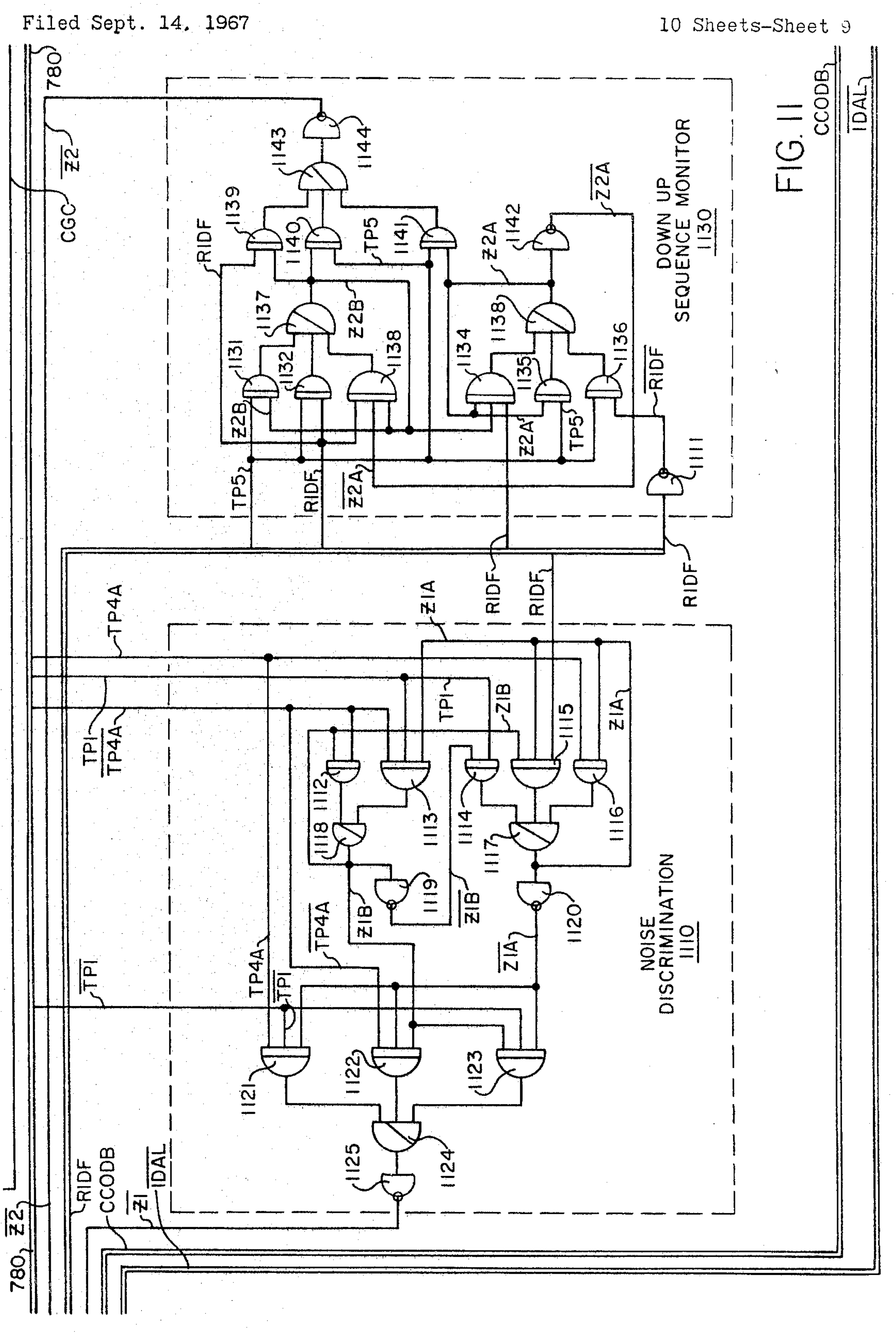
Figure 12:
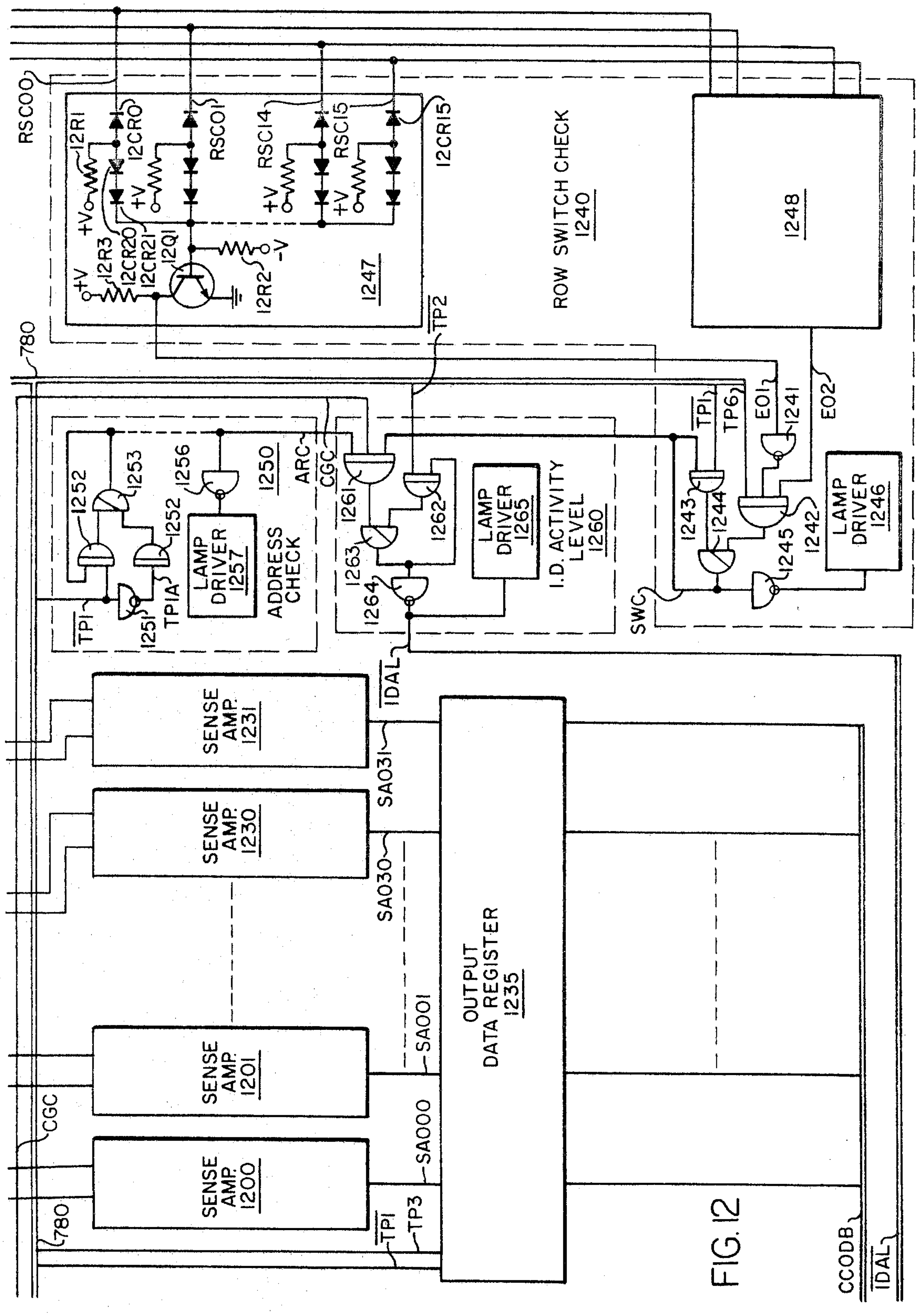

FIG. *5a* is a timing diagram which shows the relationship of the common control start signal to the pulses generated by the subsystem and also shows one example of the response of the noise discriminator circuit;

FIG. *5b* is a timing diagram which shows a second example of the response of the noise discriminator;

FIG. 6 is a timing diagram showing the response of the down-up sequence monitor circuit;

FIG. 7 is a block diagram of the common control, the address register and a symbolic block diagram of the timing pulse generator;

FIG. 8 is a schematic diagram of the current pulse generators and a symbolic block diagram of the current generator check circuit;

FIG. 9 shows the scanpoint matrix;

FIG. 10 is a schematic diagram of the row switches and a block diagram of the binary decoder;

FIG. 11 is a symbolic diagram of the noise discriminator check circuit and the down-up sequence monitor circuit;

FIG. 12 is a block diagram of the matrix output sense amplifiers and the data register, and a symbolic block diagram of the address register check circuit, the input detector activity level circuit and the row switch monitor circuit; and FIG. 13 shows how FIGS. 7–12 are to be arranged.

(I) GENERAL DESCRIPTION

Figure 1:
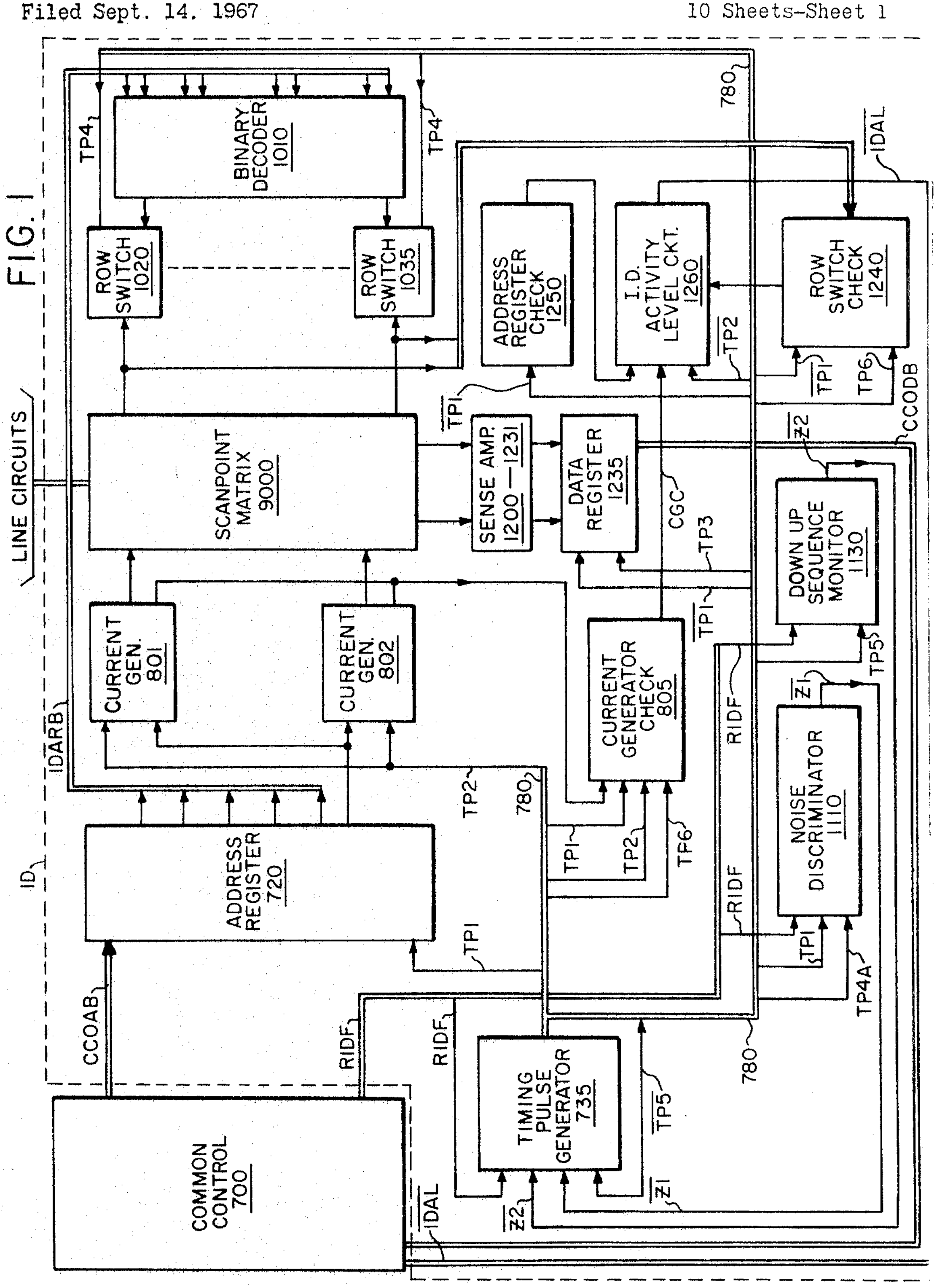
FIG. 1 is a block diagram of a subsystem for monitoring a plurality of circuits according to the invention.

Referring to FIG. 1, there is shown, in block diagram form, an illustrative embodiment of the invention wherein the subsystem ID, is used for monitoring a plurality of telephone line circuits in an electronic communication system to detect service requests. Similar monitoring devices may be connected, for example, to dialing trunks, to junctor circuits, etc. to perform other monitoring functions such as detecting dial pulses and other control information. These subsystems, such as particularly subsystem ID, are connected to common control 700, as indicated in the upper left-hand corner of FIG. 1.

Each telephone line being monitored is connected to one of the sensing elements in a matrix 9000. As indicated by the initial portion of this reference numeral, the full details of matrix 9000 are shown in FIG. 9, and a typical sensing element is shown in detail in FIG. 2. Insofar as possible, the same numbers will be used to designate apparatus in FIG. 1 as are subsequently employed to designate the detailed showing of the corresponding apparatus in FIGS. 7 through 12.

Figure 2:
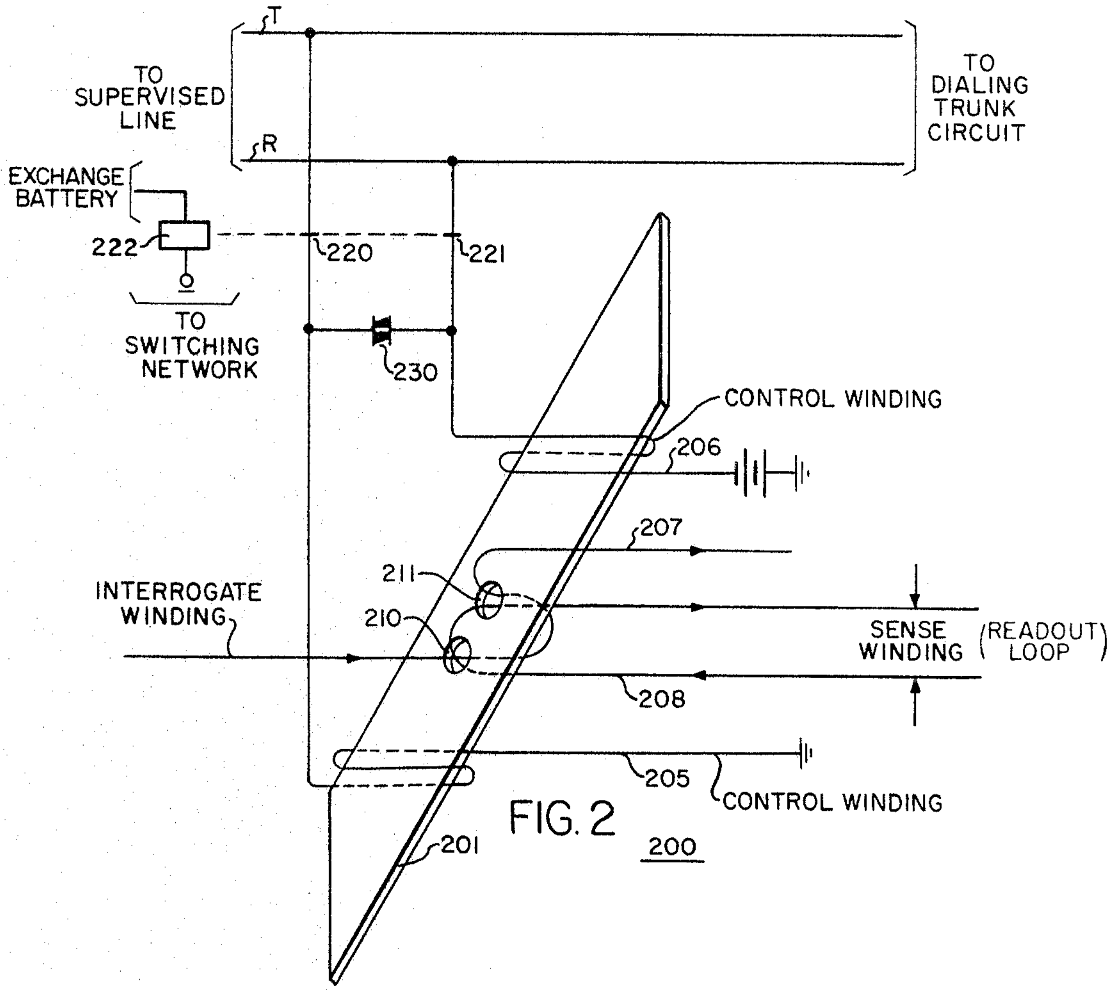
FIG. 2 is a perspective view of a sensing element used in the scanpoint matrix.

Referring to FIG. 2, sensing element 200 comprises a stick 201 of linear ferrite material having control windings 205, 206, an interrogate winding 207 and a sense winding 208 wound on it. Two apertures 210 and 211 are provided near the center of the element and the sense and the interrogate windings are threaded through the apertures.

The interrogate and the sense windings both link non-remanent flux paths around the apertures and since they link the same flux paths, they are magnetically coupled to one another. The control windings are wound around the element and link non-remanent flux paths that are perpendicular to the flux paths that couple the interrogate and sense windings.

Currents in the windings that lie in the aforementioned flux paths will create two orthogonal flux fields. Because of the orthogonal relationship of the flux fields, there is no electromagnetic coupling between the control windings and the interrogate and sense windings; that is, there is no conventional or transformer-type coupling present. A reaction to the presence of current in the control windings is coupled to the other windings only through the interaction of the orthogonal flux fields resulting in saturation of the magnetic element.

Because the magnetic coupling between the control windings and the interrogate and sense windings is minimized through the use of orthogonally oriented windings, the sensing device has a high signal-to-noise ratio. This characteristic is desirable when the device is used to monitor a telephone line circuit which may exhibit a wide range of current levels depending on whether the particular line circuit being monitored includes either a long or a short loop of transmission line.

The circuits being monitored are each connected to the control windings of an individual sense element. The control windings are electrically matched to provide maximum longitudinal noise immunity. One winding is connected between ground and the top side (T) of the supervised line circuit. The other winding is connected between battery and the ring side (R) of the supervised circuit. Both control windings are connected to the line circuit to be supervised through break contacts 220, 221 of a cutoff relay 222. The relay is operated through the switching network via common control to remove the line monitoring device from the line terminals after the supervisory function has been performed. If the device is not removed after the connection between the calling and the called parties has been established, the device would shunt the talking path and would decrease the transmitting and receiving efficiencies of the telephone circuit.

The control windings are wound coaxially with the stick and are connected so that when a current path is completed by the remote supervised circuit, as for example by a supervised line circuit being placed in the off-hook state, the current in these windings produces mutually aiding fluxes in the longitudinal direction of the element. Thus, in accordance with subscriber action on-hook, off-hook operations, line current, which serves as a control current, will flow in the control windings of the element.

Figure 3:
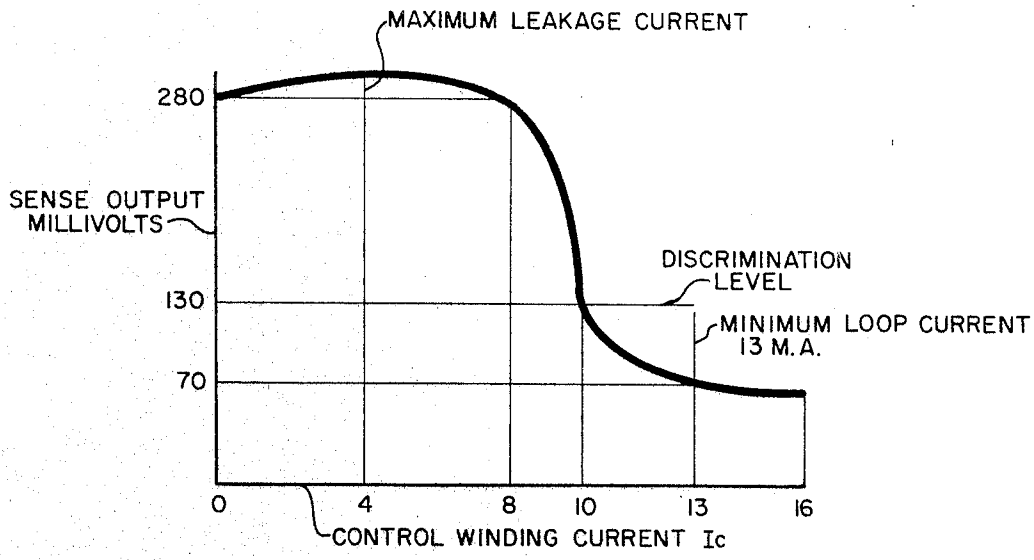
FIG. 3 is the operating characteristic of a typical sensing element.

The ferrite stick serves as a magnetic coupling medium for the interrogate and the sense windings and depending on whether or not a predetermined amount of current is flowing in the control windings the element is either saturated or unsaturated. In FIG. 3, which is a plot of the relationship of control winding current and output voltage for an element used to monitor a line circuit, it can be seen that when the magnitude of the current flowing in the control windings is less than eight milliamperes, the coupling between the interrogate and the sense windings is maximum and the output voltage on the sense winding due to interrogate current pulse of approximately 500 ma. is also maximum, approximately 280 mv. On the other hand, when the magnitude of the control current exceeds a predetermined value, for this embodiment 13 ma., the amount of coupling is a minimum and the output voltage 70 mv., is a minimum.

The sensitivity, that is, the amount of control current required to decrease the output voltage on the sense winding to 130 mv., the discrimination level, is approximately 10 ma., and is a function of the permeability of the ferrite material used. Thus, a material having a high permeability is used.

Another important characteristic of the material is its coercive force. To minimize the number of ampere-turns required for saturation, a material having a low coercive force is used. Once the coercive force of a ferrite material is fixed, the number of control winding turns needed is mainly a function of the device sensitivity as required for the particular application.

For information as to other embodiments of elements suitable for application in this subsystem, the reader is directed to my earlier application S.N. 545,451, filed Apr. 26, 1966; and that of J. G. Van Bosse, S.N. 523,365, filed Jan. 27, 1966.

Each input detector subsystem interrogate cycle is initiated at common control 700, FIG. 1. The address of the particular row to be read is generated at common control 700 in binary form and is placed on the common control output address bus (CCOAB).

At the same time the address is placed on the CCOAB, a signal is generated at the common control and is transmitted to the input detector (ID) over cable RIDF. Each cable between the common control and the input detector sybsystem has its ends terminated in a cable driver-cable receiver pair (not shown).

Each interrogate cycle within the ID is initiated by the RIDF signal. However, except for the initiation of the cycle by the sending of the RIDF signal, the interrogation of the matrix is controlled within the ID. Approximately 5 microseconds are required to complete a full interrogate cycle. The frequency of occurrance of interrogate cycles is a function of the common control.

When the signal on cable RIDF is received at the input detector, the generation of timing pulses is initiated in coincidence with the leading edge of the signal, in response to the order from the common control.

Six timing pulses which are chronologically related to the reception of the RIDF signal are generated by the input detector timing pulse generator 735. These pulses are used to synchronize the internal functions of the input detector. Pulse TP1 is used to clear the information from the output data register 1235, to clear the address register 720 and to load the new address on CCOAB into the address register. Pulse TP1 is also the criterion for comparison with the RIDF signal to determine whether the RIDF signal is of a predetermined duration to provide a check against the receipt of a noise signal via lead RIDF. Pulse TP2 is used to turn on the current pulse generator at the proper time. Pulse TP3 is used to strobe the output of the sense amplifiers into the output data register. Pulse TP4 is used to turn on one of the row switches at the proper time. Pulse TP5 prevents the timing pulse generator from generating a new series of pulses for at least 2.5 microseconds after the end of an interrogate cycle. Pulse TP6 enables the input detector activity level (IDAL) circuit 1260 at the proper time in the interrogate cycle.

In addition to generating its own operation sequencing pulses, the input detector also performs self-checking functions during each interrogate cycle. These checks insure that each cycle has been executed properly and that there has been no system malfunction during an interrogate operation. It should be noted that these checks are performed during the interrogate cycle but independently of the interrogate operation. Consequently, there is a saving of time which would be required if the input detector circuits were checked periodically and independently of the interrogate cycle. The circuits which perform these self-checks include the RIDF noise discriminator circuit 1110 which compares the RIDF command to TP1, a 0.5 microsecond pulse, to determine whether or not RIDF has lasted for at least 0.5 microsecond. RIDF signals of less than 0.5 microsecond are considered to be noise. If the RIDF is found to be valid, the cycle will continue. If, on the other hand, the RIDF command is found to be noise, the generation of pulses TP2, TP3, TP4 will be inhibited and the cycle will be cancelled.

The RIDF down-up sequence monitor circuit 1130 insures that only one RIDF command will be operable to initiate the generation of timing pulses during each interrogate cycle and further provides a delay between interrogate cycles. The RIDF noise discriminator circuit and the RIDF down-up sequence monitor function to inhibit the operation of the timing pulse generator, whenever an error is detected. Since both of these units perform timing functions in coaction with the timing pulse generator proper they may be regarded as part of the overall timing apparatus of the input detector, and they have been so treated in the detailed description of the timing circuitry given hereinbelow.

Four other circuits monitor the operation of the input detector "hardware" and send a signal to common control to report on the status of the input detector "hardware." An address register check circuit (AR) 1250 checks to see that the address register is operable and can accept an address from the common control; a current generator check circuit (CGC) 805 checks to see that one and only one of the two current generators has operated during each interrogate cycle; a row switch check circuit (RSC) 1240 checks to see that one and only one of the 16 row switches has operated during each interrogate cycle; and, an input detector activity level circuit (IDALC) 1260 monitors the outputs of the last three circuits, and provides an indication to the common control that a valid interrogate cycle has been completed and that data is available in the output data register. This indication is passed to the common control over cable IDAL.

Referring to FIG. 1 and FIG. 9, the matrix which is described in more detail in section 3 below, has thirty-two rows of elements and there are thirty-two elements in each of the matrix rows for a total of one thousand twenty-four elements. The elements in one of the rows are accessed simultaneously by enabling the proper combination of one of the two current generators 801, 802 and one of the sixteen row switches 1020–1035. The particular current generator and row switch pair is designated by the address from common control that is stored in the 5-bit address register 720. Bits one to four are decoded by binary decoder 1010 and used to select the proper row switch. Bit five is used to select one of the current generators 801 or 802. Once the address has been received, the proper current generator and row switch are enabled by timing pulses TP2 and TP4, respectively. An interrogate pulse from the current generator will be sent through the interrogate winding of each element in the row designated. When the interrogate pulse traverses the interrogate winding of an unsaturated sense element, a pulse will be induced in the sense winding of the element. On the other hand, if the element is saturated due to the amount of current flowing in its control windings, the interrogate current pulse will not be coupled to the sense winding. By monitoring the output of the sense element, via the sense winding, the status of a line circuit can be determined. The thirty-two sense windings from the thirty-two elements in the row that were addressed are connected to thirty-two sense amplifiers 1200–1231. The outputs of the sense amplifiers are connected to a 32-bit output data register 1235 which receives that 32-bit word which describes the status of the thirty-two elements that have been interrogated. The output data information is strobed into the output data register 1235 by timing pulse TP3, and when the IDAL signal is received by the common control, the data present in the output data register will be returned to the common control via bus CCODB.

(II) DETAILED DESCRIPTION (FIGS. 7–12)

(1) Timing circuits (FIGS. 7 and 11)

(*a*) *Timing pulse generator.*—Timing pulse generator 735 which, as mentioned above, generates the six timing pulses TP1–TP6 which synchronize the internal functions of the input detector subsystem comprises a delay line 740 having taps CP1–CP5 along its length, a master timing pulse generator MTPG, including logic gates 741–744, that is, AND gates 741, 742, OR gate 743 and inverter or NOT gate 744, providing a master timing pulse MTP which propagates down the delay line, and logic gates 750–760 having their inputs connected to predetermined delay line taps. The symbols employed for the AND, OR and NOT gates of master timing pulse generator MTPG, FIG. 7, have also been used in the remainder of FIG. 7 as well as in the other figures to represent these three kinds of logic gates, respectively. For purposes of explanation of the operation of these circuits, it is assumed that true signals are of the magnitude of the positive voltage supply and that false signals are of ground potential.

The master timing pulse is generated by MTPG with the following logic:

$$MTP=(RIDF\ \overline{Z1}\ \overline{Z2})+(MTP\ \overline{TP5}\ \overline{Z1}\ RSDC)$$

The RIDF signal is a command received from the common control to initiate the generation of the MTP. Signal Z1 is the true output of the RIDF noise discriminator circuit 1110 and will be true whenever it has been determined that the RIDF signal is noise rather than a valid command from the common control. Signal Z2 is the true output of the RIDF down-up sequence monitor circuit 1130 and will be true at the completion of each valid interrogate cycle to provide a predetermined interval between read cycles. Signal Z2 allows only one read cycle for a predetermined time interval regardless of the number of down-up sequences of the RIDF signal during the time interval.

Input RSDC is a DC reset signal which resets the MTPG through RC network 710 when the power is first turned on after which it is ineffectual.

Although MTP is initiated by the RIDF signal, it is independent of its duration. This has the inherent feature of excluding from the system any noise superimposed on the RIDF signal. The duration of the MTP is determined by the length of the delay line which it drives and for delay line 740, the duration is 2.5 microseconds.

The delay line 740 is terminated at one end, tap CP1, by a driver 746 and at the other end, tap CP5, by a high input impedance logic gate 750. The other tapped outputs CP2–CP4 are connected to high input impedance logic gates in the pulse forming logic circuitry 750–760.

The logic circuits used in this system have inherent per-stage delays of approximately 25 nanoseconds. These intrastage delays are advantageously used to facilitate the sequential operation of the timing pulse generating circuits and the self-checking circuits of the subsystem.

Once the MTP has been generated, this pulse is "latched on" until pulse TP5 is generated. Pulse TP5 terminates MTP when MTP has lasted for 2.5 microseconds.

As MTP propagates down the delay line, it is tapped at various points CP1–CP5 so as to provide the following time delays from the delay line input CP1:

| | Microseconds |
|---|---|
| CP1 | 0 |
| CP2 | 0.5 |
| CP3 | 1.3 |
| CP4 | 2.0 |
| CP5 | 2.5 |

Timing pulses TP1, TP2, TP3 and TP6 are obtained by connecting taps required to provide the desired pulse durations to a logic gate which "ANDS" the signals appearing at these taps. For example, timing pulse TP1 is generated by the logical combination of taps CP1 and CP2 as MTP propagates down the delay line by the following logic: $TP1=CP1\ \overline{CP2}$. Pulse TP1 starts when the leading edge of MTP passes CP1 and is terminated when the leading edge of MTP passes CP2. The remaining pulses TP2–TP6 are generated similarly by the following logic:

$$TP2=CP2\ \overline{CP3}\ \overline{Z1}$$
$$TP3=CP2\ \overline{CP4}\ \overline{Z1}$$
$$TP4=CP2\ \overline{Z1}$$
$$TP4A=CP2$$
$$TP5=CP5$$
$$TP6=CP3\ \overline{CP4}\ \overline{Z1}$$

Timing pulses TP1–TP6 and the required complements are distributed throughout the input detector system via timing pulse cable 780.

Figure 5A:
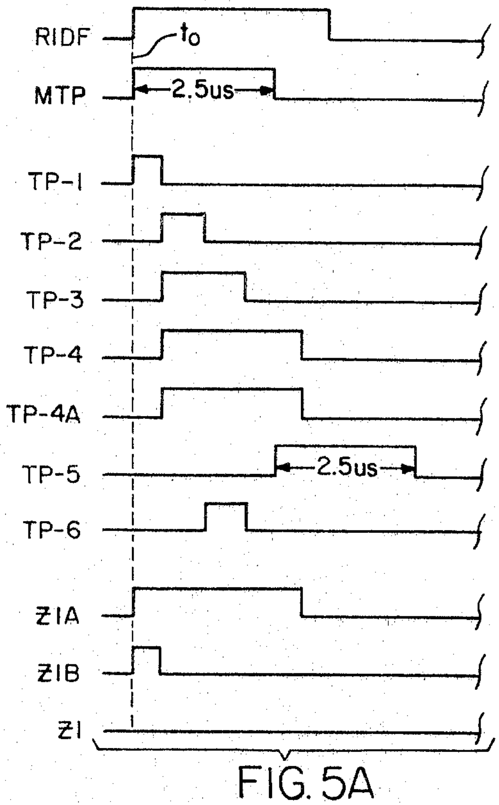

All events within the input detector are timed with respect to the leading edge of RIDF which may be considered as time-zero ($t_0$) for each input detector interrogate cycle. FIG. 5*a* is a timing chart which includes the relationship of the six timing pulses to the RIDF signal and to MTP. Due to the logic circuit delays mentioned above, MTP will not be generated at time $t_0$ but will be delay, by gates 742 and 743, approximately 50 nanoseconds from the leading edge of RIDF. Similar delays are obtained with respect to the other timing and control signals, but for purposes of simplification these delays will be ignored in the description of the timing relationships of these circuits.

Referring to FIG. 5*a*, timing pulse TP1 starts at $t_0$ and lasts for 0.5 microsecond and is used to clear the output data register and to strobe the address information into the address register.

Timing pulse TP2 starts at $t=0.5$ microsecond and lasts for 0.8 microsecond and is used to control the operation of the current pulse generators.

Timing pulse TP3 starts at $t=0.5$ microsecond and lasts for 1.5 microseconds and is used to strobe the output of the sense amplifiers into the output data register.

Timing pulse TP4 starts at $t=0.5$ microsecond and lasts for 2.5 microseconds and is used to control the operation of the row switches.

Timing pulse TP4A starts at $t=0.5$ microsecond and lasts for 2.5 microseconds and is used to control the operation of the RIDF noise discrimination circuit.

Timing pulse TP5 begins at $t=2.5$ microseconds and lasts for 2.5 microseconds and is used as a time-out signal to terminate the master timing pulse after 2.5 microseconds and to lock-up the output data register for 2.5 microseconds by preventing the start of a new read cycle.

Timing pulse TP6 starts at $t=1.3$ microseconds and lasts for 0.7 microsecond. This pulse is used as an enable for the self-checking circuits.

(*b*) *RIDF noise discriminator circuit.*—The possibility of a noise transient developing on cable RIDF and being interpreted as a read command and setting the system into a faulty operation is precluded by a noise discriminator circuit 1110 that analyzes the RIDF signal by measuring its duration. A noise transient is likely to be of shorter duration than 0.5 microsecond, and since a timing pulse TP1 of this duration is available, it is used as a criterion by which to decide the validity of the RIDF signal. This comparison is performed by logic gates 1112–1125.

Since the access time of the input detector is set at 2.5 microseconds, it is undesirable to delay the readout for 0.5 microsecond, while the incoming read command is being analyzed. Therefore, all signals arriving on the read-command bus are considered to be valid read commands and accordingly, the system is put into operation and the readout cycle is initiated.

If the signal on the RIDF lead is shorter in duration than TP1, a control signal Z1 is generated. Signal Z1 cancels the completion of the read cycle by inhibiting timing pulses TP2, TP3, TP4 thereby preventing the current generators and row switches from turning on. Inhibit signal Z1 also turns off the MTPG, FIG. 7, and cuts short the master timing pulse. Since a read command was not generated by common control, the common control will not be looking for the IDAL signal, nor will there be an attempt to read the data register.

Two inputs TP1 and TP4A, FIG. 11, in addition to the RIDF signal, control the operation of the noise discriminator circuit. Pulse TP1, which lasts for 0.5 microsecond, is used as the criterion for determining whether or not the signal on the RIDF lead is greater than 0.5 microsecond in duration. Pulse TP4A is similar to pulse TP4, but is not subject to inhibit by the output of Z1 of the noise discrimination circuit. Pulse TP4A is used to reset the RIDF noise circuit after each noise check has been made.

The operation of the noise discriminator circuit can be described by the following logic:

$$Z1=(\overline{Z1A}\ \overline{TP1}\ TP4A)+(\overline{Z1A}\ Z1B\ \overline{TP4A})+(\overline{Z1A}\ Z1B\ \overline{TP1})$$
$$Z1A=(\overline{Z1B}\ TP1)+(Z1A\ TP4A)+(Z1A\ Z1B\ RIDF)$$
$$Z1B=(Z1B\ \overline{TP4A})+(\overline{TP4A}\ TP1\ Z1A)$$

Figure 5B:
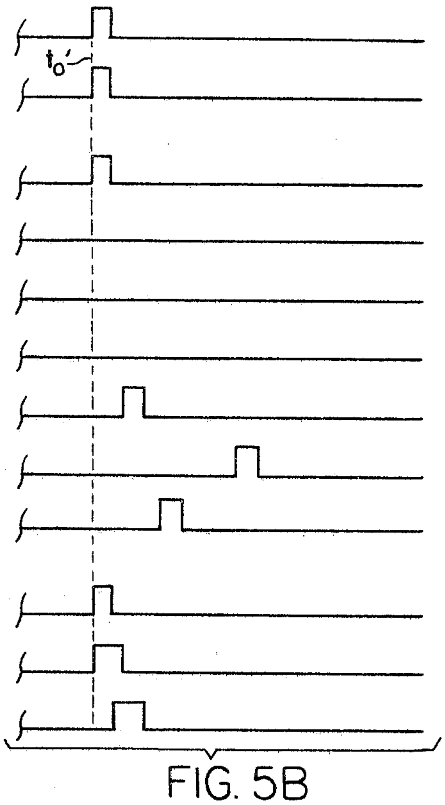

The operation of the RIDF noise discrimination circuit can best be understood with reference to the timing diagram of FIGS. 5*a* and 5*b*.

Due to the sequential nature of the logic circuits which comprise the RIDF noise discriminator circuit, there will be certain inter-stage delays associated with the circuits. Referring to the timing level diagram FIG. 5*a*, after the presence of a signal on lead RIDF has been detected, the master timing pulse and pulse TP1 are generated at $t_0$. At the coincidence of the signal on lead RIDF and pulse TP1, the output Z1A at gate 1117 (FIG. 11) becomes true and after an inter-stage delay, the output Z1B of gate 1118 becomes true. At the end of TP1, since the signal is still present on lead RIDF, the signal is a valid RIDF command and pulses TP2–TP6 are then generated. Pulse TP4A resets the latch comprising gates 1112, 1113, 1118 and Z1B goes to zero. At the end of pulse TP4A, the latch comprising gates 1114–1117 is reset and Z1A goes to zero. Since the signal on lead RIDF lasted longer than pulse TP1, the error signal output Z1 was not generated.

Referring to the timing levels shown in FIG. 5*b*, the signal on lead RIDF is shown to be less than the predetermined interval of 0.5 microsecond. Pulses MTP and TP1 are generated at $t_0'$ in response to the detection of a signal on lead RIDF as before. With the coincidence of the signal on lead RIDF and pulse TP1, the output Z1A of gate 1117 becomes true and subsequently output Z1B becomes true. However, in this instance, the signal on lead RIDF goes to zero in less than 0.5 microsecond. Consequently, MTP goes to zero and TP1 goes to zero after a short delay caused by the logic circuitry of the master timing pulse generator. In response to the signal on lead RIDF going to zero, output Z1A goes to zero and since output Z1A goes to zero before output Z1B, the noise discriminator circuit generates the command Z1 via gates 1121–1125 which inhibits timing pulses TP2, TP3, TP4, thereby cancelling the interrogate cycle.

(*c*) *RIDF down-up sequence monitor.*—The RIDF down-up sequence monitor, FIGS. 1 and 11, is a sequential circuit which allows only one read cycle for each RIDF down-up sequence in order to prevent oscillation of the delay line with the MTPG for RIDF signals greater than 5 microseconds duration. This circuit 1130 provides a logic signal Z2 which through latch circuits locks up the MTPG during TP5 for 2.5 microseconds after termination of the MTP thereby preventing the output data register 1235 from being cleared before the data is transmitted to the central control and also prevents the input detector from starting a second interrogate cycle based on the same RIDF command whenever the RIDF persists longer than 5 microseconds.

The RIDF signal and pulse TP5 are the two input signals used for controlling the operation of this sequential circuit. The logical representation of the down-up sequence monitor is given by the following equations:

$$Z2=(Z2B\ RIDF)+(Z2B\ TP5)+(Z2A\ TP5)$$
$$Z2A=(Z2A\ TP5)+(\overline{RIDF}\ TP5)+(Z2A\ Z2B\ RIDF)$$
$$Z2B=(Z2B\ TP5)+(RIDF\ TP5)+(\overline{Z2A}\ Z2B\ RIDF)$$

This logic is performed by gates 1131 to 1144.

Signal Z2, generated by this circuit, always becomes true when TP5 becomes true. Z2 becomes false when both RIDF and TP5 become false or when TP5 is false and RIDF has just gone through a true-false-true (down-up-down) sequence. The operation of the RIDF down-up sequence monitor circuit can best be understood with reference to the timing diagram shown in FIG. 6.

Referring to the timing level diagram, FIG. 6, whenever a signal is detected on lead RIDF, the duration of the detected signal is compared with the duration of pulse TP1 by the RIDF noise discrimination circuit 1110. If the signal is found to be a valid RIDF command from the common control, timing pulses TP2–TP6 are generated.

The RIDF signal is shown to go through an up-down-up sequence with a short duration between the up or "true" levels. Note also that the signal has gone up, down and up again during a single interrogate cycle before the end of pulse TP5.

The down-up sequence monitor prevents the generation of a second set of timing pulses, MTP and TP1–TP6 until after the end of the first interrogate cycle at the end of TP5. The output Z2 of the down-up sequence monitor inhibits the generation of a master timing pulse via gate 741. Output Z2 will remain true as long as either RIDF or TP5 is true.

Thus, in FIG. 6, the first occurring RIDF signal terminates during TP5. However, at the coincidence of pulse TP5 with RIDF, output Z2B is generated via gates 1132 and 1137 causing output Z2 of gate 1143, to be generated. When RIDF goes down during the duration of pulse TP5, output Z2 is generated which together with output Z2B will hold output Z2 true. Output Z2 continues to "lock-up" the MTPG until the end of TP5. At the end of TP5, Z2A, Z2B and Z2 go to zero.

When Z2 goes to zero, the second occurrence of RIDF causes a second series of timing pulses to be generated. This RIDF signal is seen to last longer than pulse TP5. When TP5 comes true, outputs Z2B and Z2 are generated causing the MTPG to be inhibited. At the end of TP5, RIDF is still up so the down-up sequence monitor will follow the RIDF signal continuing to inhibit the MTPG until RIDF goes down.

(2) Matrix access circuits (FIGS. 7, 8, 10 and 12)

(*a*) *Address register and binary decoder.*—The address generated at the common control 700 is placed on bus CCOAB which connects the common control with register 720, a conventional five-bt register employing sequentially operated acceptance-type latch circuits used to store the address sent from common control until the current generator-row switch is enabled during the interrogate cycle.

Bits one through four are used to select one-out-of-sixteen row switches 1020–1035 and bit five is used to select one of the two current generators 801 and 802. A binary decoder, 1010, interposed between the address register and the row switches converts the four bit binary row address to sixteen digital outputs, to permit selection of one-out-of-sixteen row switches.

The data is accepted by the address register 720 during TP1. Timing pulse TP1 clears the address register after which the data present on bus CCOAB is accepted by the register. After the duration of pulse TP1, the data is latched into the register and will remain latched in the register until it is cleared by a subsequent TP1 pulse.

(*b*) *Address register check circuit.*—It may be mentioned here that although address register check circuit 1250 does not, strictly speaking, form a part of the access apparatus proper but performs only a checking function with respect thereto, it is being described under the present heading (2) as a matter of convenience. This applies similarly to the description, included below under (*d*) and (*f*) of this heading (2), of current generator check circuit 805 and row switch check circuit 1240, respectively.

The address register check circuit (ARC) 1250 is used to indicate to the IDAL circuit that both $\overline{TP1}$ and its complement TP1A as generated by gate 1251 have been generated. Due to the interstage delay mentioned above, TP1A will be delayed approximately 25 nanoseconds from $\overline{TP1}$ so that proper operation of the ARC is assured. The address register check circuit is comprised of logic gates, 1251 through 1254. Signal $\overline{TP1}$ resets the latch circuit formed by gates 1252–1254 at the beginning of each read cycle and TP1A sets the latch circuit via gate 1253. If the circuit is not set during the interrogate cycle, this implies that TP1 was not generated. Consequently, output lead ARC which is an input to the IDAL circuit is grounded thereby preventing the setting of this circuit. This will be interpreted as an error in the address register when the IDALC is not set during TP6. The output ARC of gate 1254 is inverted by gate 1256. The output of gate 1256 is connected to lamp driver 1257 which provides a visual indication of the operation of the address register check circuit.

Figure 4:
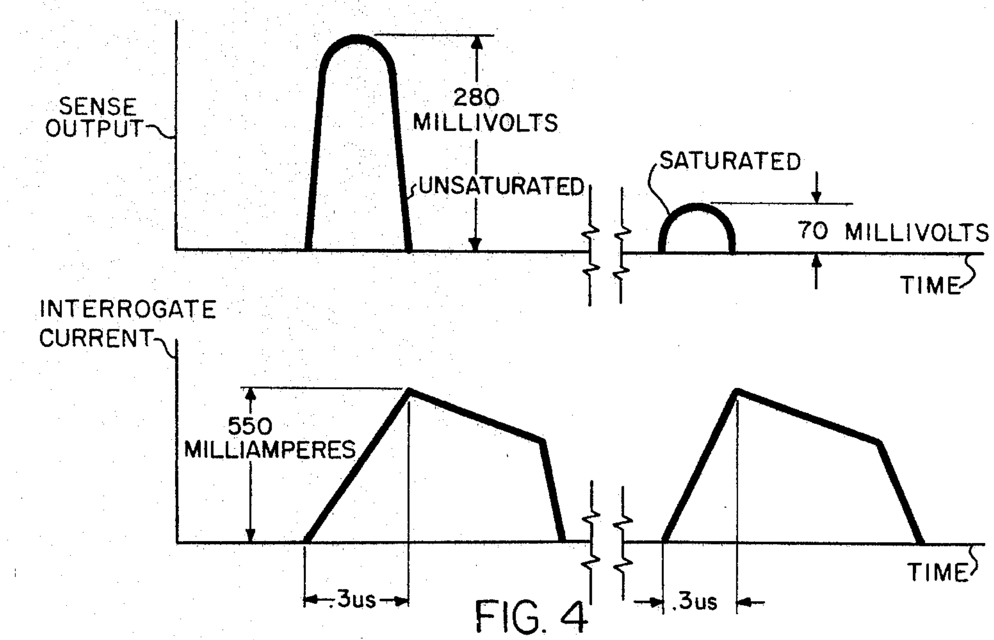
FIG. 4 shows typical waveforms for the interrogate current and the sense output voltage.

(*c*) *Current pulse generators.*—Two current pulse generators 801 and 802 are used to supply an interrogate pulse for all the rows of the matrix. Current generator 801 is connected to the odd numbered rows 01 to 31 in the matrix via lead CGO, and current generator 802 is connected to the even numbered rows 00 to 30 via lead CGE. Each current pulse generator consists of a single stage current amplifier which drives a switched inductance current pulse generator. It should be noted that one of the sixteen row switches completes the current path to electronic ground for both of the current generators. After a current path has been selected, one of the current generators that is turned on develops a current pulse of approximately 550 ma. with a 0.30 microsecond rise time. This pulse is conducted through the interrogate windings of the selected row of scanning elements. The waveform of a typical current pulse is shown in FIG. 4. A voltage of approximately 280 mv. is induced in the sense windings of the unsaturated elements during the rise time of this current pulse while the voltage induced in the sense windings of saturated elements is on the order of 70 mv. The sense amplifier connected to the sense windings can easily detect this 4:1 ratio. Typical voltage waveforms for both saturated and unsaturated elements are shown in FIG. 4. The current pulse is terminated by the current generator after one microsecond.

The row switch is turned off 1.7 microseconds later in order to delay current pulse decay transients with respect to the sensed output pulse. Synchronization of the current generator is accomplished with pulse TP2.

A current generator 802 is shown in detail in FIG. 8. Current generator 801 is similar to current generator 802 and has similar connections to the matrices and current generator check circuit. Consequently, only current generator 802 will be described in detail.

Diodes 8CR1 and 8CR2 have their anodes connected to positive volt supply (+V) through resistor 8R1. Lead 5AR0 connects cathode of diode 8CR1 to the output of bit five of the address register 720. The address register will supply +V on either lead 5AR0 or 5AR1 which is connected to current generator 801, to designate which current generator is to be energized. Lead TP2 connects the cathode of diode 8CR2 to the timing pulse cable to receive timing pulse TP2 at the appropriate time in the read cycle.

The anodes of diodes 8CR1 and 8CR2 are connected to the base of transistor 8Q1 through series diodes 8CR3 and 8CR4. Diodes 8CR3 and 8CR4 insure that sufficiently negative voltage appears between the base of transistor 8Q1 and ground so transistor 8Q1 will be held in the off state. The base of transistor 8Q1 is connected to a negative voltage supply (−V) through resistor 8R2 and the emitter of transistor 8Q1 is connected to ground. The collector of transistor 8Q1 is connected to a positive voltage supply (+V) through resistor 8R3. Diode 8CR5 has its cathode connected to the collector of transistor 8Q1 and its anode connected to the base of transistor 8Q2 through series diodes 8CR6 and 8CR7 which perform the level shifting function described above with reference to diodes 8CR3 and 8CR4. The anode of diode 8CR5 is connected to +V through resistor 8R4. The base of transistor 8Q2 is connected to −V through resistor 8R5. Transistor 8Q2 has its emitter connected to ground. The collector of transistor 8Q2 is connected to +V through inductor 8L1 and resistor 8R6. The collector-emitter voltage drop of transistor 8Q2 is limited by diodes 8CR8 and 8Z9, a Zener diode, which shunt the collector-emitter junction of transistor 8Q2. The output of the current generator is connected to the matrix interrogate windings through inductor 8L2 and transformer 8T1. Diode 8CR10 shunts inductor 8L2 to discharge inductor 8L2.

The collector of transistor 8Q2 is connected to winding 8L3 of sensing element 8T1 through inductor 8L2. Sensing element 8T1 monitors the output of the current generator to detect whether or not the current generator has supplied a current pulse to the matrix. The sensing element is similar to the elements used in the matrix, but it lacks a control winding. The interrogate winding 8L3 of the devices is connected in series with inductor 8L2 and 3 via CGE, to the sixteen even-numbered leads MR00–MR30, the interrogate conductors which thread the scanning elements in the even rows of the matrix, all as explained in greater in section 3 below.

Whenever the current generator is turned on, the current pulse sent through the matrix via leads MR00–MR30 also passes through the interrogate winding of 8T1 thereby inducing a voltage in the output winding 8L4 of 8T1. The output winding of 8T1 serves as the input to the current generator check circuit 805 described in greater detail below. Resistor 8R7 shunts the output winding 8L4 of 8T1.

Transistor 8Q1 is normally off and transistor 8Q2 is normally in saturation. Leads 5AR0 and TP2 are grounded and diodes 8CR1 and 8CR2 are conducting so that 8Q1 is cutoff. Current is passing along the path from the positive voltage supply to ground through 8R6 and 8L1. When +V signals are present on leads 5AR0 and TP2, base current is supplied to transistor 8Q1 from the +V source through resistor 8R1 and diodes 8CR3 and 8CR4 sufficient to drive transistor 8Q1 into saturation and ground its collector. Consequently, base current is diverted from the base of transistor 8Q2 which obtained current from resistor 8R4, and diodes 8CR6 and 8CR7 to the saturated collector of 8Q1 when +V is present on both 5AR0 and TP2 and transistor 8Q2 will be cutoff. When transistor 8Q2 is cutoff, the current passing through inductor 8L1 is interrupted so that the voltage across inductor 8L1 rises abruptly, providing a current pulse having a 300 nanoseconds rise time. The magnitude of the voltage rise due to the collapsing field of inductor 8L1 is limited to the breakdown voltage of Zener diode 8Z9.

The inductance of 8L2 and the series inductance of the sensing element 8T1 and the associated matrix row inductance determine the rise time of the output current pulse until a predetermined maximum current, which, in turn, is determined by the current that was flowing through inductor 8L1, is reached. Transistor 8Q2 turns off when the input signal terminates causing transistor 8Q2 to turn on, diverting the current from conductor 8L1 through the collector of transistor 8Q2.

(*d*) *Current generator check circuit.*—Sense amplifiers 803, 804, FIG. 8, which are provided at the input end of current generator check circuit 805 and form a part thereof, are connected to the output of current generators 802, 801, respectively. Sense amplifier 803, shown in detail in FIG. 8, consists of a voltage amplifier input stage and a saturated switch output stage. The input amplifier is transformer coupled to the output of the current generator via transformer 8T2. Transformer 8T2 has its primary connected to the output winding 8L4 of element AT1 and has its secondary connected to the base of transistor 8Q4. The emitter of transistor 8Q4 in the input stage is connected to −V through resistors 8R8 and 8R9. Capacitor 8C1 connects the collector of transistor 8Q4 to +V. The output of transistor 8Q4 is coupled, via capacitor 8C2, to an amplitude discrimination network comprising resistors 8R12 and 8R13 and to the base of transistor 8Q5 in the output stage. Resistors 8R12 and 8R13 bias transistor 8Q5 in the normally cutoff state. The emitter of transistor 8Q5 is connected to ground and the collector of transistor 8Q5 is connected to +V through resistor 8R14. The collector of 8Q5 is the sense amplifier output and is connected to one of the input leads of logic circuit 822 through inverter 820. Similarly, the output of sense amplifier 804 is connected to an input to logic gate 823 through inverter 821.

The current generator check circuit 805 checks to see that only one of the current generators has operated during each interrogate cycle. The monitor circuit 805 comprises "latch type" logic circuits which include gates 820–835 which perform an "exclusive OR" operation to determine if by error either both or none of the current generators have operated during one interrogate cycle, and if so to provide an error indication to the IDAL circuit by grounding the respective IDALC input lead CGC under the control of the two sense amplifier outputs and time pulses TP1, TP2 and TP6. At the beginning of each read input detector cycle, pulse TP1 sets latch circuits 807, 808 via gates 825 and 827. One of the latch circuits is reset during TP2 via gates 822 and 823 if either sense amplifier has an output. If, for example, current generator 802 is operating, the presence of a current flowing in the winding 8L3 of 8T1 will be detected and amplified by the input stage of sense amplifier 803. Transistor 8Q5 will become saturated grounding lead SAE. The signal on SAE, when inverted and "ANDed" with TP2 by gate 822, will reset latch 807 putting lead 8F1 at a ground potential. At the same time, if current generator 801 has not operated, lead SA0 will be at +V and latch 808 will not be reset so that lead 8F2 will remain at +V.

During each read operation, only one current generator should operate and, consequently, only one of the two leads 8F1, 8F2 will be ungrounded. After the current generators have been monitored, the outputs on leads 8F1 and 8F2 of the two latch circuits are combined via gates 830–833, to an "exclusive OR" circuit, which will provide an output when only one of the current generators has operated. Gates 832 and 833 are enabled at TP6. Timing pulse TP6 is used as an input to this latch circuit to eliminate the hazard of storage time differences between the two current generators when operated simultaneously. Gate 835 provides a latch for gate 834 to store the results of the CG check. The CGC latch is reset at the beginning of each interrogate cycle by time pulse TP1.

The output of gate 834 on lead CGC is connected to one of the inputs of the IDAL circuit. The function of this circuit will be described in detail later on.

Output signal $\overline{\text{CGC}}$ enables a lamp driver circuit 850 whenever an error occurs. The corresponding lamp will light and remain lit until the next read cycle is initiated. Two other lamp indicators 851, 852 are used for monitoring the operation of current generators 801 and 802 and are furnished for further diagnostic applications.

(*e*) *Row switches.*—Sixteen row switches 1020 and 1035 are used to supply electronic ground to a current path from one of the current generators through one of the scan-point matrix rows via an interrogate conductor and through one of the isolation diodes 9CR00 to 9CR31, FIG. 9. The row switch to be enabled for each interrogate cycle is designated by bits 1–4 stored in the address register. The address register outputs 1AR1–4AR0 are connected to the binary decoder inputs 1BD1–4BD0 via cable IDARB. The row switches are activated by outputs from the decoder via leads D00–D15 and synchronization of the row switches with the operation of a current generator is accomplished with a timing pulse TP4.

A row switch 1020 serving the two top rows of the matrix, FIG. 9, is shown in detail in FIG. 10. Lead D00 connects the cathode of diode 10CR1 to the output of the binary decoder. The cathode of diode 10CR2 is connected to lead TP4 which carries the synchronizing pulse from a timing pulse generator. Similarly, the inputs to row switches 1021–1035 are connected to decoder output leads D01–D15 respectively and to TP4. The anodes of diodes 10CR1 and 10CR2 are connected to a positive voltage supply (+V) through resistor 10R1. These components provide an "ANDing" function for the input signals D00 and TP4. The junction of the anodes of diodes 10CR1 and 10CR2 is connected to the base of transistor 10Q1 through diodes 10CR3 and 10CR4 which set a turn-on threshold for transistor 10Q1. The base of transistor 10Q1 is coupled to a negative voltage supply (−V) through resistor 10R2. The transistor has its emitter connected to ground and its collector connected to +V through resistor 10R3 and the primary winding of transformer 10T1. The secondary winding of transformer 10T1 is connected between the base-emitter circuit of transistor 10Q2 which is also shunted by diode 10CR5.

When either lead TP4 or D00 is grounded transistor 10Q1 is cut off and its collector and one end of the primary winding is at +V. However, when both inputs are at a +V, diodes 10CR1 and 10CR2 are reverse biased and base current is supplied to transistor 10Q1 from +V through resistor 10R1 and diode 10CR3 and 10CR4 causing transistor 10Q1 to saturate, grounding one end of the primary of 10T1. The saturated collector current of transistor 10Q1 flowing in the primary winding of transformer 10T1 is coupled to the secondary winding of 10T1 thereby providing base current for transistor 10Q2. The drive current supplied by the transistor 10Q1 saturates transistor 10Q2 which, in turn, grounds lead RS00 to complete a path for either current generator 801 or 802 through the interrogate winding MR00 or MR01 of the matrix. Resistor 10R3 limits the amount of current flowing in the primary of the transformer 10T1 to that which is needed to saturate transistor 10Q2. Diode 10CR5 limits the reverse voltage across the secondary winding of transformer 10T1 to prevent base-emitter junction break-down of transistor 10Q2.

Leads RS00–RS15 are connected to interrogate leads MR00–MR31 respectively through isolation diodes 9CR00–9CR31. A voltage limiting circuit comprising diodes 10CR6 and 10CR7 is connected between the collector and the emitter of transistor 10Q2 to limit the collector to emitter voltage of this transistor.

Lead RS00 is conneced to lead RSC00 through inverter 1042 and is connected to one of the sixteen inputs to row switch check circuits 1247 and 1248 shown in FIG. 12. The outputs of the inverters in row switches 1021–1035 are similarly connected to leads RSC01–RSC15 in the checking circuits.

(*f*) *Row switch check circuit.*—During a normal ID interrogate cycle, only one of the sixteen row switches should operate. If none of the row switches operates, information will not be read out of the scan point matrix and all ones will be stored in the output data register. Also, if more than row switch is activated, the interrogation current will split between two current paths. When this condition occurs, erroneous information will be stored in the output data register. Either of these two conditions constitutes an error and must be indicated as such by the IDAL signal generator. This is accomplished by two circuits 1247 and 1248 which monitor the outputs of the row switches.

Circuit 1247 provides a one-out-of-sixteen function to check as to whether one of the row switches has operated. Diodes 12CR0–12CR15 at the input of this circuit have their cathodes connected respectively to leads RSC00–RSC15.

Diode 12CR0 has its anode connected to +V through resistor 12R1 and is connected to the base of transistor 12Q1 through series diodes 12CR20, 12CR21 which keeps transistor 12Q1 off during the quiescent state. The base of transistor 12Q1 is connected to −V through resistor 12R2 and the emitter is connected to ground. The collector is connected to lead E01 and to +V through resistor 12R3. Lead E01 is normally at +V.

Circuit 1247 grounds lead E01 whenever the cathode of one of the sixteen input diodes 12CR0–12CR15 is at +V. In the quiescent state, transistor 12Q1 is cutoff and diodes 12CR0–12CR15 are conducting with their cathodes grounded by leads RSC00–RSC15. If one of the sixteen inputs becomes +V due to the operation of one of the row switches, the respective diode is reverse biased causing the base emitter voltage of 12Q1 to rise from −0.7 volt to $VBE_{SAT}$ and transistor 12Q1 grounds lead E01. The signal on lead E01 is inverted by gate 1241 and the inverted signal is an input to gate 1242 in the row switch check circuit.

Circuit 1248, shown in block form, is similar to circuit 1247 and has its sixteen inputs multiplied to the sixteen inputs of circuit 1247 via leads RSC00–RSC15. The bias level of the transistor in the input stage of circuit 1248 are such that the transistor will saturate and ground lead E02 only when two or more of the input diode cathodes are at +V thereby indicating that two or more row switches have operated. Lead E02 is normally at +V. During a valid read cycle, only one read switch would operate and consequently, circuit 1248 would not lead E02, so that the positive potential on E02 will be interpreted as a correct signal.

The row switch check logic comprises four logic gates, 1241 to 1244 which combine the outputs of 1247 and 1248 from the row switch monitor circuits with timing pulses $\overline{TP1}$ and TP6. This function is defined by the following equation:

$$SWC=\overline{E01}\,E02\,TP6+SWC\,\overline{TP1}$$

At the beginning of each interrogate cycle, the row switch monitor latch circuit is re-set by pulse TP1. Setting of the latch circuit takes place if lead E01 is grounded and if lead E02 is ungrounded during TP6. Output SWC is an input for the IDAL circuit and becomes +V whenever one and only one row switch has been activated during each read cycle. The SWC signal is latched up by gates 1243 and 1244 and the latch remains set until it is reset by pulse TP1. If an error has occurred, the output of gate 1244 will remain grounded and signal SWC will be ground and received as an input to the IDAL circuit.

The signal output SWC of gate 1244 is inverted by gate 1245 the output of which is connected to a lamp driver 1246 which provides a visual monitoring of the row switch check circuit.

(3) Scan point element matrix (FIG. 9)

The scan point matrix comprises thirty-two rows with thirty-two scan elements, of the type shown in FIG. 2, in each row, providing a capability for monitoring one thousand twenty-four points.

Each of the line circuits (not shown) that is being monitored is connected to the control windings of a respective scan element in a manner similar to that shown in FIG. 2. The control windings are designated with a prefix letter T or R representing Tip or Ring followed by a four digit number, the first two digits of which designate the row and the last two digits designating the column in which the scan element is located. Thus, the scanning device located in row 00 column 00 has its control windings designated T–0000, R–0000. Similarly, the scanning element located in row 00 column 31 has its control windings designated T–0031, R–0031. Control winding T–0000 has one end connected to the Tip line of the circuit being monitored and has its other end connected to exchange ground. Control winding R–0000 has one end connected to the Ring side of the line being monitored and its other end connected to exchange battery. Similarly the other control windings for all of the elements in the matrix would be connected to corresponding Tip and Ring lines and to battery or ground. Thus, a circuit path can be traced from the exchange battery through the control winding to the subscriber subset and a return path through the other control winding to exchange ground. Control current will flow in the control winding whenever the subscriber loop is in the active or "off-hook" condition. This control current will saturate the scanning element thereby decoupling the interrogate and sense windings.

A row of scanning elements is interrogated by either current generator 801 or current generator 802 which will apply a current pulse of the type shown in FIG. 4 to one of interrogate loops MR00–MR31. Low impedance, twisted pair conductors are used for both the sense and interrogate windings to minimize coupling between circuits. Since there are thirty-two rows of scanning elements there are thirty-two interrogate loops in the matrix illustrated. The interrogate conductors in the even numbered rows MR00, MR02 . . . MR28, MR30 are all connected in common to the output of current generator 802 via lead CGE. Similarly, the interrogate conductors for the odd numbered rows MR01, MR03 . . . MR29, MR31 are commonly connected to the output of current generator 801 via lead CGO. Each interrogate conductor is threaded through the apertures in all of the scanning elements in a particular row.

The current path through the matrix is completed by one of the sixteen row switches 1020–1035. Each row switch is common to two rows in the matrix; for instance, row switch 1020 is connected to row 00 and row 01 in the matrix via interrogate conductors MR00 and MR01 respectively. Interrogate conductor MR00 is connected between leads CGE and RS00 and threads apertures in scanning elements 9100, 9101 . . . 9130, 9131. Similarly, conductor MR01 is connected between leads CGO and RS00. Since a common row switch 1020 is shared between two matrix rows, isolation diodes 9CR00 through 9CR31 are used to prevent sneakpaths from occurring and to enable the interrogate current to traverse only the selected path through the matrix.

If the address contained in the input address register is 00000, the first four bits designate that row switch 1020 will be selected and the last bit designates that current generator 802 will be selected. When row switch 1020 is activated during timing interval TP4, leads MR00 and MR01 will be grounded. Consequently, when current generator 802 is operated during timing interval TP2 the current pulse generated will traverse interrogate conductor MR00 through each of the scan elements 9100 through 9131 in the scanned row and through diode 9CR00 to the ground supplied by row switch 1020.

The state of the external circuit monitored by the scan point is ascertained (when the scanning element is interrogated) by the presence or absence of a pulse induced in one of thirty-two readout or sense windings MC00–MC31. Since an interrogate pulse is applied to thirty-two scan elements in a single row, the pulses induced in the thirty-two readout loops reflect the condition of the thirty-two associated monitored circuits. These conditions are sent to the output data register 1235 via sense windings MC00–MC31 and sense amplifiers 1200–1231. For example, a sense winding loop may be traced beginning at the input of sense amplifier 1200 in FIG. 12 through the apertures 9A31–9A00 in scanning elements 9400, 9300 . . . 9100, 9000 and then continuing back through the other apertures 9B00–9B31 of each scanning device to the other output terminal of the sense amplifier 1200. A single sense winding such as MC00 thus threads the apertures in each scanning element contained in one of the columns of the matrix. Similar sense windings MC01 through MC31 thread the apertures in the scanning elements contained in the other columns 1–31 of the matrix. Windings MC01–MC31 terminate in sense amplifiers 1201 through 1231, respectively. The pulses which are induced in the sense windings are detected in the sense amplifiers 1200 through 1231, shown in FIG. 12.

(4) Matrix output sense amplifiers and output data register (FIG. 12)

Each time a row of scanning elements in the matrix 9000 is interrogated, a pulse is induced in the sense windings MC00 through MC31 of any elements that are unsaturated, but no pulse is induced in the sense windings of any element that is saturated.

Sense amplifiers 1200 through 1231, which are connected to the sense windings, are identical to sense amplifiers 803 and 804 which are used to monitor the outputs of current generators 802 and 801 and have been described in detail previously with reference to FIG. 8.

When the line circuit being monitored is inactive or in the "on-hook" condition at the time the scanning device is interrogated, the scanning device will not be saturated and hence the current pulse traversing the interrogate loop will cause a voltage pulse to be induced in the sense winding of the element connected to the line being monitored. This voltage pulse will be coupled to the input of the sense amplifier causing saturation of the output stage of the sense amplifier and grounding the corresponding output lead SA000–SA031. On the other hand, when a line being scanned is in use or in the "off-hook" condition, the scanning element associated with the line will be saturated due to the control current flowing through the control windings of the element. Consequently, a voltage pulse will not be induced in the respective sense winding when the interrogate current pulse is applied to the interrogate conductor, and the output lead and the corresponding sense amplifier will not be grounded.

The outputs of the thirty-two sense amplifiers are connected to a thirty-two bit data register 1235 which accepts the thirty-two bit word indicative of the condition of the lines scanned from the sense amplifiers. Reset-type latch circuits are used for the data register.

At the beginning of each scan, timing interval TP1 is used to clear the output data register. The data comprising thirty-two bits of information available on the thirty-two sense amplifier output leads SA000 through SA031 is strobed into the data register during timing interval TP3. The data is stored in the output data register during each interrogate cycle and is then read by the common control, after the IDAL signal has been received by common control.

(5) Input detector activity level checking circuitry (FIG. 12)

The input detector activity level circuit 1260 (IDALC) provides a reply to the common control to indicate that the input detector subsystem has accepted a row address on an RIDF order from the common control, that a successful interrogate operation has been completed and that data is available in the output data register. The raising and the lowering of the level of the signal output of the IDAL circuit is dependent upon proper operation of the input detector subsystem, which in turn is predicated on the following factors:

(1) An address has been accepted by the address register after the address of the previous cycle was cleared from the address register;

(2) That only one of the current generators has operated; and (3) That only one of the sixteen row switches has operated.

The IDAL circuit 1260 comprises logic gates 1261–1264. These gates form a set-reset type latch circuit. Because of the set-reset function with the circuit being reset in response to a proper operation, the complementary output $\overline{IDAL}$ is used as the output signal which is sent to the common control. The IDAL function may be defined logically by the following equation:

$$IDAL=(ARC\ CGC\ SWC)+(\overline{IDAL}\ \overline{TP2})$$

During time interval TP2 the IDAL circuit is set and provides a true output on lead $\overline{IDAL}$. When pulse TP6 is generated, the current generator check circuit, FIGS. 1 and 8, and the row switch check circuit. FIGS. 1 and 12, are enabled and if the interrogate cycle was successfully completed, the inputs CGC, SWC and $\overline{ARC}$ are true so that the IDAL circuit is reset and lead $\overline{IDAL}$ is grounded.

Lead $\overline{IDAL}$ which is connected to the common control provides first, by the setting of the IDAL circuit, an indication to the common control that an interrogate cycle is in progress and secondly, by the resetting of the IDAL circuit during time interval TP6, that the cycle has been successfully completed and that data is available in the output data system.

If due to error, the address register check circuit, the current generator check circuit, or the row switch check circuit fail to provide the level indicative of proper operation, the IDAL circuit will not be reset during TP6 and the presence of a positive signal on lead IDAL will be noted by the common control, and the output data register will not be read.

In the event of an error, the common control will readdress the scanning subsystem using the same address.

SUMMARY

Thus, from the foregoing it is apparent that applicant has provided a subsystem having means for generating a plurality of pulses used for synchronizing and controlling the operation of the subsystem and circuits for checking the operation of the subsystem. The subsystem can be used for monitoring a plurality of circuits to ascertain the condition of the circuits and for providing an indication of any changes in the condition of the circuits.

The subsystem is advantageously used as a peripheral unit in a common control system to continuously monitor circuits of the system and, in response to a command from the common control to convert the status of the circuits being monitored into a form suitable for acceptance by the common control and to return the status of the circuits to the common control.

Inasmuch as the subsystem generates its own timing and control pulses, it is capable of completing a scan of the monitored circuits independently of the common control once the command to scan the circuits has been given by the common control.

What is claimed is:

1. In a telephone system of the common control type wherein a plurality of peripheral subsystems are controlled by a common control shared by the subsystems,
  a peripheral subsystem arranged to monitor a plurality of circuits of said telephone system and to indicate to said common control the condition of said circuits, said subsystem comprising:
    a plurality of monitoring devices each individually associated with one of said circuits and providing an output only when the associated circuit is in a first condition and providing no output when the circuit is in a second condition;
    a plurality of circuit aggregates provided in common to said monitoring devices, said aggregates including access and output apparatus coupled both to said common control and to said devices, said access apparatus causing said devices to be accessed in accordance with address signals received from the common control, and said output apparatus passing output information derived from the accessed devices and indicative of the condition of the associated monitored circuits to said common control;
    and timing apparatus including a timing pulse generator means also provided in common to said monitoring devices and connected to said circuit aggregates and said common control for causing said timing apparatus, in response to the receipt from said common control of a distinct start signal commanding the initiation of an interrogate cycle, to latch up and to generate a plurality of separate timing pulses each chronologically related to said start signal and to the other timing pulses, for thereafter controlling the operation of said plurality of circuit aggregates during said interrogate cycle independently of said common control.

2. A peripheral subsystem in a telephone system as claimed in claim 1, wherein said timing pulse generator means includes a delay line having a plurality of taps, means connected to said delay line and causing a signal output at each of said taps, and a plurality of logic gates connected to said taps for logically combining said signal outputs to form said timing pulses.

3. A peripheral subsystem in a telephone system as claimed in claim 1, wherein said devices are connected in a matrix comprising a plurality of rows and columns and each said monitoring device of said matrix comprises a transformer having a saturable core that has first and second orthogonally oriented non-remanent flux paths;
  a control winding wound on said core to link said first non-remanent flux path and connected to an individual one of said circuits;
  an interrogate loop wound on said core to link said second non-remanent flux path, the interrogate loops of certain of said devices being interconnected so as to connect said devices in said plurality of rows;
  a readout loop wound on said core to link said second non-remanent flux path, the readout loops of certain of said devices being interconnected so as to connect said devices in said plurality of columns,
  whereupon during interrogation of a particular one of said rows of devices under the control of said timing pulses, a current pulse applied to the interrogate loops connected in said particular row induces a pulse in the readout loops of the devices in said particular row having an unsaturated core and does not induce a pulse in the readout loops of the devices in said row having a saturated core;
  the core of a particular one of said devices being unsaturated when the associated circuit is in said first condition and the core of said particular device being saturated when the associated circuit is in said second condition such that each of said readout loops is selectively energized in accordance with the condition of the circuit monitored.

4. A peripheral subsystem in a telephone system as claimed in claim 3, wherein said access apparatus includes;
  an address register;
  a plurality of current pulse generators each individually connected to the input of a group of said rows; and
  a plurality of row switches each individually connected to the output of a group of said rows; the number of rows in each output group being equal to the number of current generators;
  said current pulse generators and said row switches being controlled by said address register to conjointly designate the particular one of said rows to be interrogated responsive to the receipt by said address register of the address of said particular row and a first one of said timing pulses;
  and the designated one of said current pulse generators and the designated one of said row switches being actuated responsive to the receipt of a second and third one of said timing pulses, respectively, to apply said current pulse to said interrogate loop.

5. A peripheral subsystem in a telephone system as claimed in claim 4, wherein said output apparatus includes an output data register, said output data register being cleared responsive to the receipt of said first timing pulse.

6. A peripheral subsystem in a telephone system as claimed in claim 1 wherein said timing apparatus includes means for determining that the duration of said start signal is longer than a predetermined duration and means for inhibiting the generation of timing pulses when the duration of said start signal is shorter than said predetermined duration.

7. A peripheral subsystem in a telephone system as claimed in claim 1, wherein said timing apparatus includes means for detecting the time interval between successive start signals and for inhibiting the generation of timing pulses in response to the receipt of the later one of said successive start signals when said interval is less than a predetermined time interval.

8. A peripheral ubsystem in a telephone system as claimed in claim 1, wherein said circuit aggregates further include checking means controlled by said timing pulses and by said access apparatus for determining simultaneously with said accessed devices that only accessed devices are being interrogated, and error indicating means connected to said checking means for providing an indication whenever devices other than said accessed devices are being interrogated.

9. A peripheral subsystem in a telephone system as claimed in claim 1, wherein said circuit aggregates further include means connected to said access apparatus for monitoring the operation of said access apparatus during said interrogate cycle and for determining that said devices have been intetrrogated during said cycle,
  the last-mentioned monitoring means being further connected to said timing apparatus and to said common control and being operated responsive to the receipt of a timing pulse at a predetermined time of said interrogate cycle to provide an electrical indication to said common control whenever said access apparatus has failed to interrogate said devices during said interrogate cycle.

said common control being operated responsive to the receipt of said indication from the last-mentioned monitoring means to inhibit the passage of said output information from said output apparatus to said common control.

References Cited

UNITED STATES PATENTS

| | | |
|---|---|---|
| 3,175,042 | 3/1965 | Baldwin et al. |
| 3,254,157 | 5/1966 | Guercio et al. |
| 3,281,539 | 10/1966 | Dunlap et al. |

KATHLEEN H. CLAFFY, Primary Examiner

R. P. MYERS, Assistant Examiner